Sept. 20, 1932.  T. TERADA  1,878,349
BEET HARVESTER
Filed Jan. 26, 1931  3 Sheets-Sheet 2
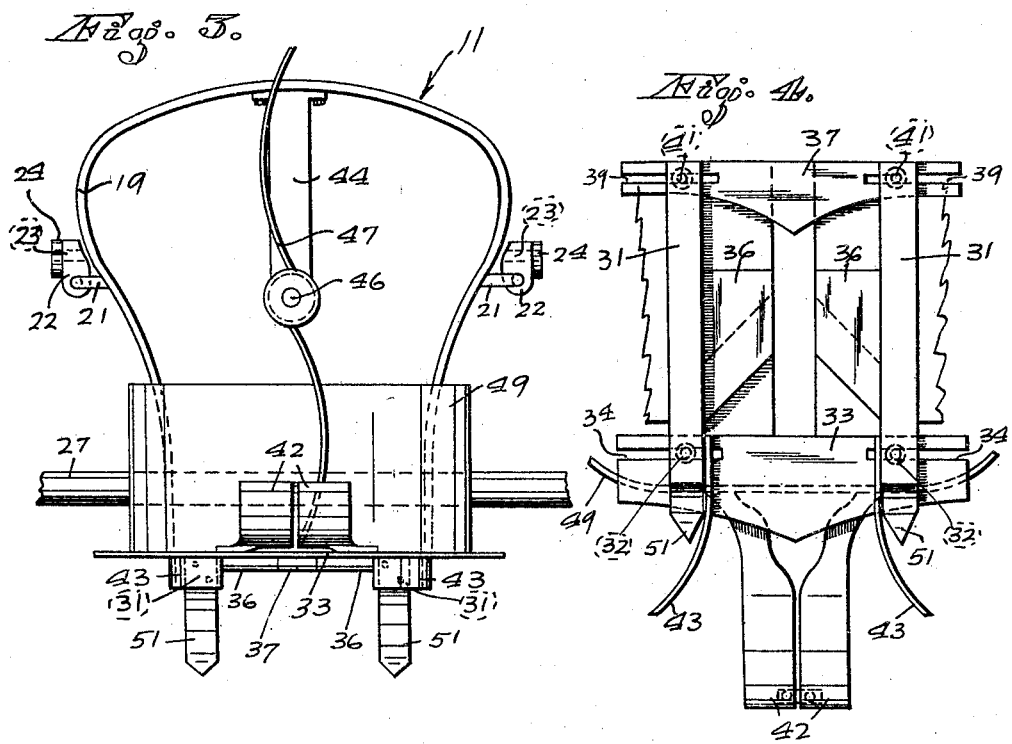
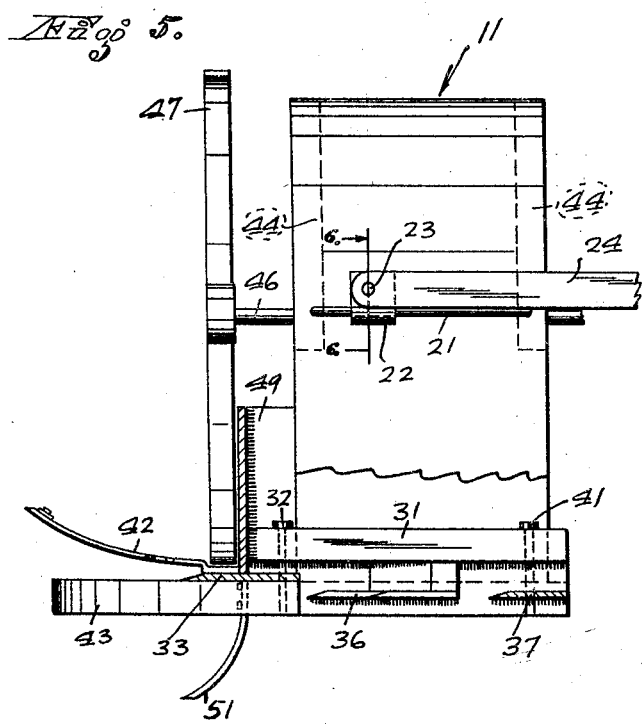
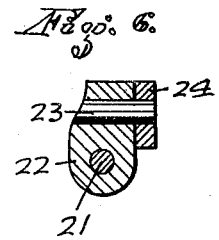
INVENTOR.
TOYOMATSU TERADA
BY
ATTORNEYS.

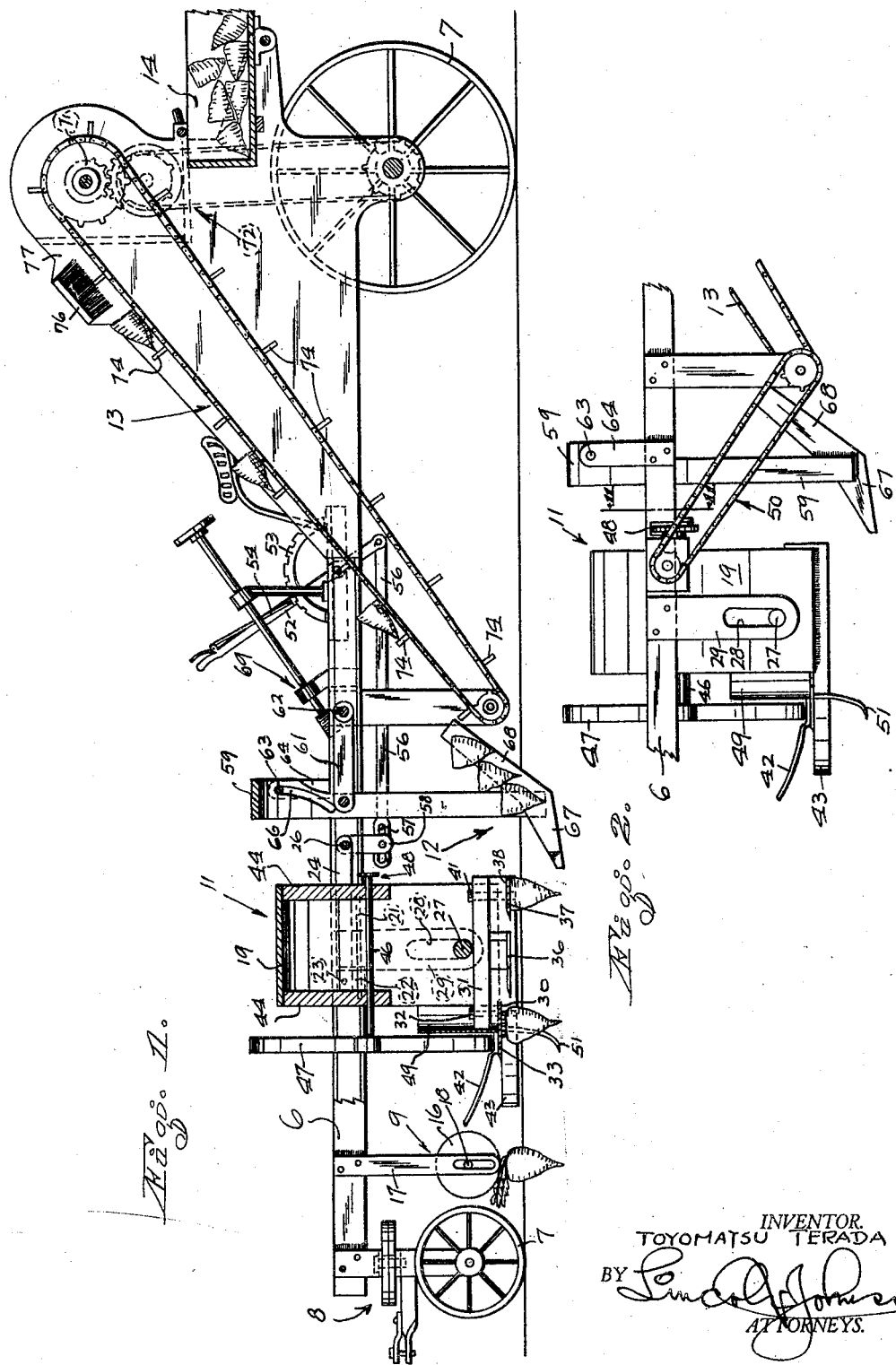

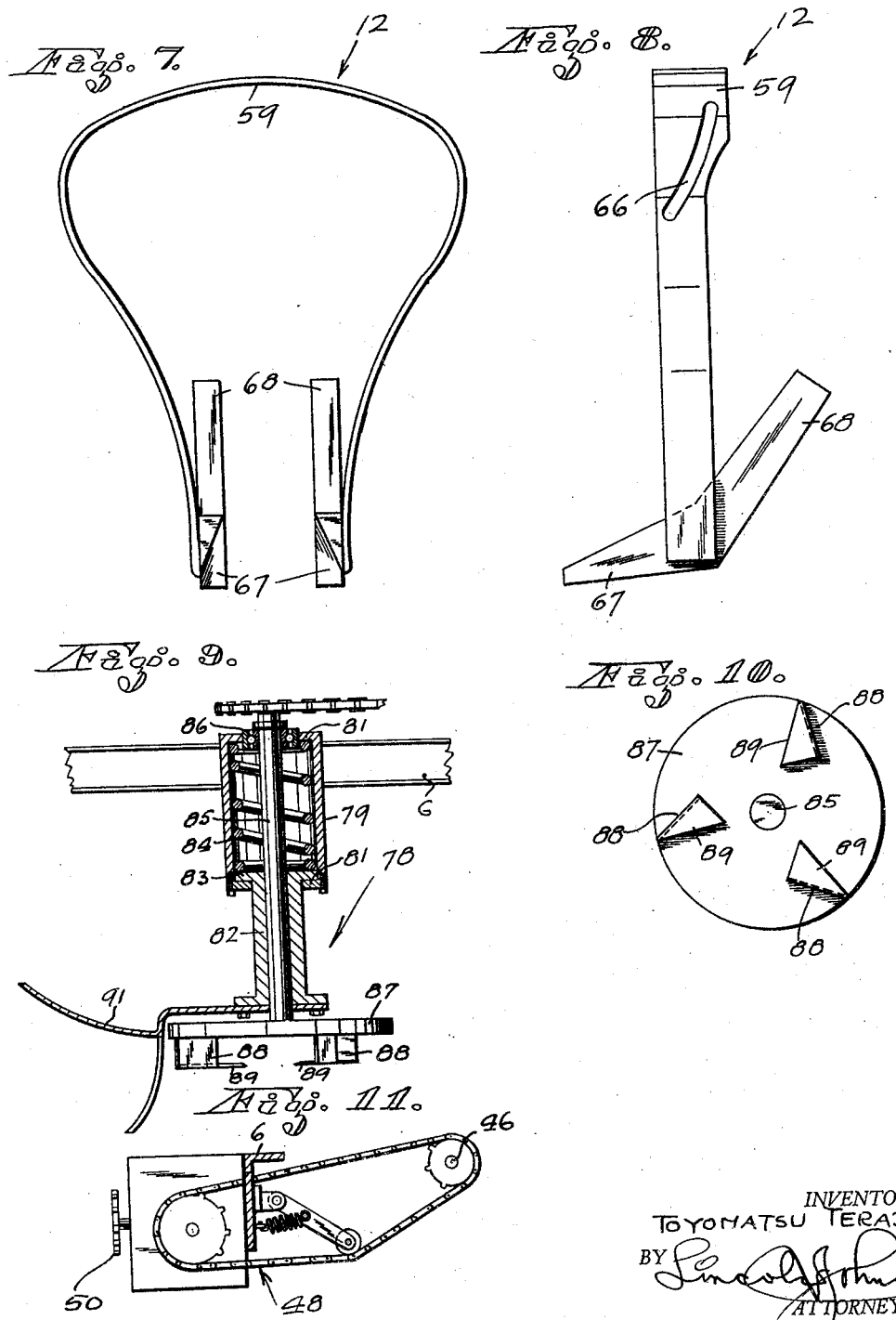

Patented Sept. 20, 1932

1,878,349

UNITED STATES PATENT OFFICE

TOYOMATSU TERADA, OF SAN FRANCISCO, CALIFORNIA

BEET HARVESTER

Application filed January 26, 1931. Serial No. 511,256.

This invention relates to harvester machines adapted for harvesting vegetables which are partly below the surface of the ground and the tops of which extend above the ground.

The primary object of the invention is to provide a machine for harvesting sugar beets or the like, which is adapted to be properly centered relatively to the beet to be harvested, and to efficiently cut off the foliage of the beets first, and then to sever the top of the beet; the topping mechanism being self-adjustable in accordance with the height of the top of the beets above the ground so as to effect the uniform topping of the beets harvested; means being provided to flatten the foliage before the same is cut; and means being also provided to remove the severed foliage from the machine so as to prevent clogging of the machine.

Other objects and advantages are to provide a vegetable harvesting machine that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying drawings:

Fig. 1 is a side elevation of my harvester machine partly in section.

Fig. 2 is a fragmental elevational view of the machine.

Fig. 3 is a front view of the topping mechanism of the machine.

Fig. 4 is a bottom plan view of the topping mechanism.

Fig. 5 is a side elevation of the topping mechanism.

Fig. 6 is a sectional detail view of the topping mechanism mounting the section, being taken on the line 6—6 of Fig. 5.

Fig. 7 is a front view of the plow of my machine and its mounting.

Fig. 8 is a side view of the plow.

Fig. 9 is a sectional detail of rotary topping mechanism for my machine.

Fig. 10 is a bottom plan view of the rotary topping mechanism.

Fig. 11 is a fragmental sectional view of the machine showing the driving mechanism for the rotary ejector, the section being taken on the line 11—11 of Fig. 2.

In carrying out my invention I make use of a main frame 6, supported on wheels 7, and provided with the usual king-pin and draw bar arrangement 8, to be drawn by a team of horses, or by any suitable traction means.

On the frame 6 is carried a foliage flattener 9, behind which is carried a topping mechanism 11, followed by a plow 12 for removing the topped beet from the ground. Behind the plow 12 is an upwardly inclined conveyor 13 on the main frame 6, onto which the harvested beets are discharged from the plow 12. The beets are finally collected in a box 14 at the end of the conveyor 13.

In detail the foliage flattener 9 includes a roller 16 journaled in vertical bearing brackets 17, which latter depend from the main frame 6. The shafts 18 on the ends of the roller 16 are slidable in the vertically elongated bearings of the brackets 17 and the roller 16 is urged toward the ground by its own gravity.

The topping mechanism 11 includes a swivelable auxiliary frame 19 formed by a loop of spring plate so that its lower ends are in opposed spaced relation. On the outside face of each leg of the loop frame 19 is provided a horizontal rail 21, the opposite ends of which are bent and fixed into the frame 19 so as to hold the rails 21 in spaced parallel relation to the legs of the frame 19. On each rail 21 is slidable a trunnion 22 which is rockable on a pivot 23 in the end of a lever arm 24. This last described slidably rockable support is identical on both sides of the auxiliary frame 19. A cross shaft 26 is journaled in the main frame 6 behind the frame 19, on which shaft 26 is a feather key in engagement with the lever arms 24, so that the lever arms 24 can be rocked by turning the shaft 26, and can also slide lengthwise on the shaft 26 when the frame 19 is shifted transversely to the main frame 6.

In order to maintain the bottom of the frame 19 in a substantially horizontal position, another cross shaft 27 extends through the legs of the loop frame 19 and is supported in vertically elongated slots 28 in brackets 29, which latter depend from the sides of the main frame 6. The frame 19 is slidable lengthwise on the shaft 27 and crosswise between the sides of the frame 6.

On the bottom ends of the legs of the loop frame 19 is a sectional knife-supporting shoe made of parallel shoe sections 31 to form a split shoe on the bottom ends of the legs. Each section 31 has a horizontal transverse slit 30 in its front end through which extend vertical pins 32. A foliage trimming knife blade 33 is disposed in the slits 30 of the shoe sections 31. The blade 33 has slots 34 extending from the respective ends of the blade 33 toward the middle portion of the latter. The pins 32 in the forward portions of the shoe sections 31 slidably extend through the slots 34, so that the sections 31 can be moved apart and toward each other without displacing the foliage cutter blade 33. It is to be noted that the forward edge of the blade 33 is substantially V shaped, converging toward the center.

On the bottom of each shoe section 31 and behind the blade 33 is mounted a fixed knife 36. The knives 36 are below the level of the blade 33. The forward edges of the knives 36 are at an angle to each other so as to diverge toward the forward ends of the knives. The knives 36 are in parallel spaced relation to each other, so as to cut into the top of the beet on opposite sides. The center portion of the top of the beet is cut off by a cutter blade 37 disposed rearwardly of the knives 36 but in the plane of the latter. The cutter blade 37 is supported in slits 38 in rear ends of the sections 31, which slits 38 are at a lower level than the front slits 30. The blade 37 has elongated slots 39 therein through which extend pins 41 operating similarly to the said pins 32.

Thus when the topping mechanism 11 is advanced over the beet first the trimming knife 33 cuts off the foliage of the beet then the side knives 36 cut off the opposite sides or corners of the top of the beet; and lastly the center cutter blade 37 levels off the top of the beet.

Top guide fingers 42 are extended forwardly and upwardly from the shoes 31 so as to engage the foliage on the top of the beet and cause the raising of the entire mechanism 11. At this time the rails 21 slide in the trunnions 22 and the lever arms 24 are turned slightly upwardly. The guide fingers 42 are so spaced above the trimming knife 33 that when the former ride on the top of the beets, the latter is in alignment with only the foliage of the beet without cutting more than the foliage from the beet. The above mentioned spacing also determines the depth to which the top of the beet is cut, consequently the harvested beets will be trimmed and topped to a uniform depth regardless of the height of their protruding portions above the ground.

In order to center the topping mechanism 11 over the beets to be harvested, I provide lateral guide fingers 43 extending forwardly and outwardly from the respective shoes 31 in a substantially horizontal plane. These fingers 43 are curved and engage the respective sides of the beets so as to shift the topping mechanism 11 transversely to the frame 6 so that the topping knives and blades are brought into proper alignment with the beets to be harvested.

On the frame 19 are bearing brackets 44 in which is supported a shaft 46. On the forward end of the shaft 46 is supported a sweeper blade 47 to rotate above the trimmer knife 33 and eject the severed foliage that may collect above the latter. The rear end of the shaft 46 is connected by a suitable transmission mechanism 48 to the conveyor 13 to be operated thereby. In order to further prevent the severed foliage to clog the topping mechanism 11, a guard 49 is provided in front of the lower portion of the frame 19 immediately above the knife 33 but placed behind the cutting edges of the said knife 33. The guard 49 is so connected to the frame 19 that the legs of the frame 19 and shoes 31 are slidable transversely relatively to the guard 49.

From the front ends of the shoes 31 depend downwardly fixed ground loosening blades 51, which break the ground and cut the finer roots on the opposite sides of the beet to be harvested.

The topping mechanism 11 can be raised into inoperative position by a fulcrumed bar 52 on the frame 6 moving over a toothed quadrant 53 and fixed in position thereon by the usual releasable detent 54. To the lower end of the bar 52 is pivoted a forwardly extended link 56, the forward end of the latter having an elongated axial slot 57 therein to engage a pin on the end of an arm 58. The arm 58 is fixedly keyed to the cross shaft 26 to rock the same. The slot 57 permits the self-adjusting movement of the topping mechanism 11 without moving the bar 52.

The plow 12 includes a bowed spring frame 59 pivotally supported on lever arms 61, which latter are shiftably keyed to a cross shaft 62 on the frame 6. The upper portion of the frame 59 is guided by pins 63 on brackets 64 on the frame 6, which pins 63 extend into arcuate slots 66 on the respective sides of the frame 59. From the opposed, resiliently spaced legs of the frame 59 extend substantially parallel plow members 67 to a point below the ground. The points of the plow members 67 are slightly divergent to readily receive the underground portions of the beets therebetween. The rearward extensions 68 of the plow members 67 extend over the lower end of the conveyor 12, and as the harvester is advanced the topped beets are plowed out of the ground, due to the rearwardly inclined position of the members 67 and are held resiliently between said members 67. The successively lifted beets push each other rearwardly between the member 67 and extensions 68 until dropped one by one, on the lower intake end of the conveyor 13.

The cross shaft 62 is rockable by a worm and gear and handle bar control 69 on the frame 6 so as to move the arms 61 and raise or lower the entire plow 12 as desired.

The conveyor 13 extends rearwardly and upwardly and is supported on the rear of the frame 6 in the usual manner. One of the rear sprockets 71 of the conveyor 12 is connected by a suitable chain and sprocket transmission 72 to one of the rear wheels 7 or to the rotary axle of the vehicle frame 6 and is rotated thereby as the harvester is advanced on the ground, so as to carry the beets upwardly. Prongs 74 on the conveyor 13 prevent the rolling off of the beets from the said inclined conveyor.

It is to be noted that the forward, lower sprockets of the conveyor 13 are suitably connected to the ejector transmission mechanism 48, as shown at 50 in Fig. 2.

A brush 76 is mounted on the upright member 77 of the frame 6 to extend above the conveyor 13. The bristles of the brush 76 extend into close proximity to the surface of the conveyor 13 to contact the surfaces of the beets passing under the brush 76 thereby cleaning the same.

In operation the harvester is advanced on the field, over the beets. First the front roller flattens the foliage of the beets so that the topping mechanism is not raised too high thereby. Then the topping mechanism severs the foliage from the tops of the beets, cuts the sides or corners thereof, and levels off the top to a uniform depth. The severed foliage is ejected from the topping mechanism by the rotary ejector. The ground around the beets is loosened at the same time when the beets are topped. Then the topped beets are plowed and lifted out of the ground, transferred to the conveyor, brushed and finally collected in the collector box at the rear end of machine. The box 14 may be turned to dump the beets when desired.

Both the topping mechanism and the plow can be easily elevated into inoperative position when not in use, and also can be adjusted to a normal operative position with freedom of limited self-adjustment to conform to the width and height of the portion of the beets above the ground.

In Figs. 9 and 10, I show a revolving topping mechanism 78 adapted to be mounted on the frame 6. This mechanism 78 comprises a tubular bracket 79 shiftably mounted on the frame 6. A flange 81 extends inwardly at each end of the bracket 79. In the lower end of the bracket 79 is suspended a telescoping sleeve 82, an upper flange 83 of the latter being slidable within the bracket 79 and normally resting on the lower flange 81 of the latter. A coil spring 84 in the bracket 79 bears against the upper bracket flange 81 and against the sleeve flange 83 to urge the sleeve downwardly. A vertical shaft 85 extends through the bracket 79 and through the sleeve 82 and is journaled in a ball bearing 86. On the lower end of the shaft 85 is a circular disc 87 on the under face of which are provided three vertical blades 88. Each blade 88 has a vertical cutting edge, and also a horizontal knife edge 89 in the same direction of rotation. The shaft 85 is connected by a suitable transmission to the conveyor 13, and when rotated it rotates the disc 87 and causes the blades 88 and knives 89 to take successive cuts into the top of the beet at the same level. In order to regulate the depth of the cut, an upwardly and forwardly extended guide finger 91 extended from the forward side of the lower end of the sleeve 82, to ride over the foliage of the beets and raise the topping mechanism to the desired height.

Having thus described this invention, what I claim and desire to secure by Letters Patent is:

1. The combination with a beet harvester including a main frame, of an auxiliary frame, a series of means to adjustably suspend the auxiliary frame on the main frame, a cutter supporting element on the auxiliary frame, a cutter blade on said element, a pair of side cutter blades on the element spaced rearwardly and downwardly from the first blade, and a center leveling knife on the element disposed rearwardly of the pair of blades and at substantially the same level as the pair of blades; and means on the auxiliary frame to move over the foliage of the beets, thereby to hold the auxiliary frame and the blades in uniform relation to the tops of the beets to be harvested.

2. The combination with a beet harvester including a main frame, a swivelable auxiliary frame on the main frame, and a guide member on the auxiliary frame to engage the foliage of the beet so as to hold the auxiliary frame in operative relation to the top of the beet to be harvested; of a foliage trimming knife on the frame being so spaced below said guide to cut the foliage of the beet as the harvester is advanced over the beet; a pair of side cutters disposed on the auxiliary frame and being spaced rearwardly and downwardly from the foliage trimming knife on the auxiliary frame spaced rearwardly from the side cutter knife and being disposed in the level of the latter.

3. The combination with a beet harvester including a main frame, a swivelable auxiliary frame on the main frame, and a guide member on the auxiliary frame to engage the foliage of the beet so as to hold the auxiliary frame in operative relation to the top of the beet to be harvested; a split supporting element on the auxilary frame, a foliage trimming knife arranged on the frame so spaced below the level of the guide member to cut only the foliage of the beet to be harvested; a side cutter on each section of the split element to cut off the opposite side corners of the top of the beet, said side cutters being spaced rearwardly and downwardly from the foliage trimming knife, and a center trimmer knife on the said auxiliary frame extended to the level of the cutters but rearwardly spaced therefrom to level off the cut on the top of the beet.

4. The combination with a beet harvester including a main frame, a swivelable auxiliary frame on the main frame, and a guide member on the auxiliary frame to engage the foliage of the beet so as to hold the auxiliary frame in operative relation to the top of the beet to be harvested; a split supporting element on the auxiliary frame, a foliage trimming knife arranged on the frame so spaced below the level of the guide member to cut only the foliage of the beet to be harvested; a side cutter on each section of the split element to cut off the opposite side corners of the top of the beet, said side cutters being spaced rearwardly and downwardly from the foliage trimming knife, a center trimmer knife on the said auxiliary frame extended to the level of the cutters but rearwardly spaced therefrom to level off the cut on the top of the beet, and downwardly extended blades operatively arranged below the foliage trimmer to cut into the ground adjacent the beet.

5. The combination with a beet harvester including a main frame, a swivelable auxiliary frame on the main frame, and a guide member on the auxiliary frame to engage the foliage of the beet so as to hold the auxiliary frame in operative relation to the top of the beet to be harvested; a split supporting element on the auxiliary frame, a foliage trimming knife arranged on the frame so spaced below the level of the guide member to cut only the foliage of the beet to be harvested; a side cutter on each section of the split element to cut off the opposite side corners of the top of the beet, said side cutters being spaced rearwardly and downwardly from the foliage trimming knife, and a center trimmer knife on the said auxiliary frame extended to the level of the cutters but rearwardly spaced therefrom to level off the cut on the top of the beet, said guides extended from the split member to engage the sides of the beet, to center the cutters and knives over the beet to be harvested.

6. The combination with a beet harvester including a main frame, a swivelable auxiliary frame on the main frame, and a guide member on the auxiliary frame to engage the foliage of the beet so as to hold the auxiliary frame in operative relation to the top of the beet to be harvested; a split supporting element on the auxiliary frame, a foliage trimming knife arranged on the frame so spaced below the level of the guide member to cut only the foliage of the beet to be harvested; a side cutter on each section of the split element to cut off the opposite side corners of the top of the beet, said side cutters being spaced rearwardly and downwardly from the foliage trimming knife, a center trimmer knife on the said auxiliary frame extended to the level of the cutters but rearwardly spaced therefrom to level off the cut on the top of the beet, said guides extended from the split member to engage the sides of the beet, to center the cutters and knives over the beet to be harvested; and downwardly extended blades operatively arranged below the foliage trimmer to cut into the ground adjacent the beet.

7. The combination with a beet harvester including a main frame, a swivelable auxiliary frame on the main frame, and a guide member on the auxiliary frame to engage the foliage of the beet so as to hold the auxiliary frame in operative relation to the top of the beet to be harvested; a split supporting element on the auxiliary frame, a foliage trimming knife arranged on the frame so spaced below the level of the guide member to cut only the foliage of the beet to be harvested; a side cutter on each section of the split element to cut off the opposite side corners of the top of the beet, said side cutters being spaced rearwardly and downwardly from the foliage trimming knife, and a center trimmer knife on the said auxiliary frame extended to the level of the cutters but rearwardly spaced therefrom to level off the cut on the top of the beet, said auxiliary frame being adapted to hold the sections of the split element in resiliently spaced relation to each other.

8. The combination with a beet harvester including a main frame, a swivelable auxiliary frame on the main frame, and a guide member on the auxiliary frame to engage the foliage of the beet so as to hold the auxiliary frame in operative relation to the top of the beet to be harvested, of a foliage trimmer knife, a pair of side cutters, and a center trimmer knife arranged on the auxiliary frame so that the side cutter and last mentioned knife are rearwardly and downwardly spaced from the first mentioned knife, and the last mentioned knife being rearwardly spaced from said cutters but on the level of the latter.

9. The combination with a beet harvester including a main frame, a swivelable auxiliary frame on the main frame, and a guide member on the auxiliary frame to engage the foliage of the beet so as to hold the auxiliary frame in operative relation to the top of the beet to be harvested, of a foliage trimmer knife, a pair of side cutters, and a center trimmer knife arranged on the auxiliary frame so that the side cutter and last mentioned knife are rearwardly and downwardly spaced from the first mentioned knife, the last mentioned knife being rearwardly spaced from said cutters but on the level of the latter; and means in operative relation to the foliage trimming knife to eject the removed foliage sidewise from the way of the auxiliary frame.

10. A beet harvester including a main frame, an auxiliary frame yieldably suspended from the main frame, a blade carrying shoe on the auxiliary frame, a central guide element extended forwardly from the shoe to engage the foliage of the beet and to guide the shoe over the beet, a knife on the shoe spaced rearwardly of and below the guide element so as to sever only the foliage of the beet; and a set of knives spaced rearwardly and downwardly from the first mentioned knife for severing the top of the beet.

11. A beet harvester including a main frame, an auxiliary frame suspended from the main frame, a blade carrying shoe on the auxiliary frame, a guide central finger extended forwardly from the shoe to engage the foliage of the beet so as to guide the shoe over the foliage, a knife on the shoe so spaced below the guide finger as to sever only the foliage of the beet, a set of knives spaced rearwardly and downwardly from the first mentioned knife for severing the top of the beet; and diverging side guide fingers extended forwardly and outwardly on each side of the shoe to abut against the respective sides of the beet and center the knives thereover.

12. A beet harvester including a main frame, an auxiliary frame movably suspended from the main frame, a blade carrying shoe on the auxiliary frame, a central guide finger extended forwardly from the shoe to engage the top of the foliage of the beet to guide the shoe thereover, a knife on the shoe so spaced below the guide finger as to sever only the foliage of the beet; and a set of knives spaced rearwardly from the first mentioned knife for severing the top of the beet.

13. A beet harvester including a main frame, an auxiliary frame movably suspended from the main frame, a blade carrying shoe on the auxiliary frame, a guide finger extended forwardly from the shoe to engage the foliage of the beet, a knife on the shoe so spaced below the guide finger as to sever only the foliage of the beet; and a set of knives spaced rearwardly from the first mentioned knife for severing the top of the beet, said shoe including parallel sections movable relatively to each other and slidable transversely on the first knife, said auxiliary frame being adapted to hold the sections in resiliently spaced position.

14. A beet harvester including a main frame, an auxiliary frame movably suspended from the main frame, a blade carrying shoe on the auxiliary frame, a guide finger extended forwardly from the shoe to engage the foliage of the beet, a knife on the shoe so spaced below the guide finger as to sever only the foliage of the beet; a set of knives spaced rearwardly from the first mentioned knife for severing the top of the beet, said shoe including parallel sections movable relatively to each other and slidable transversely on the first knife, said auxiliary frame being adapted to hold the sections in resiliently spaced position; and a side guide finger extended from each shoe section to engage the respective sides of the top of the beet thereby to center the knives relatively to the beet and to space the shoes according to the width of the top of the beet.

15. A beet harvester including a roller to flatten the foliage of the beet, a foliage cutting knife carried behind the roller, means cooperating with the foliage to cause the knife to cut only the foliage of the beet, another set of knives carried behind the first knife to cut off the top of the beet, and means operatively related to the first knife to eject the severed foliage collected above the first knife.

16. A beet harvester including a roller to flatten the foliage of the beet, a foliage cutting knife carried behind the roller, means cooperating with the foliage to cause the knife to cut only the foliage of the beet, another set of knives carried behind the first knife to cut off the top of the beet, and rotary means operatively related to the first knife to eject the severed foliage collected above the first knife.

In testimony whereof, I have hereunto set my hand at San Francisco, California, this 14th day of January, 1931.

TOYOMATSU TERADA.